United States Patent
Raghavan

(10) Patent No.: US 12,020,214 B2
(45) Date of Patent: *Jun. 25, 2024

(54) SYSTEM FOR APPLYING AN ARTIFICIAL INTELLIGENCE ENGINE IN REAL-TIME TO AFFECT COURSE CORRECTIONS AND INFLUENCE OUTCOMES

(71) Applicant: Truist Bank, Charlotte, NC (US)

(72) Inventor: Sriram Raghavan, Orlando, FL (US)

(73) Assignee: TRUIST BANK, Charlotte, NC (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/743,551

(22) Filed: May 13, 2022

(65) Prior Publication Data
US 2023/0325785 A1    Oct. 12, 2023

Related U.S. Application Data

(63) Continuation of application No. 17/717,312, filed on Apr. 11, 2022, now Pat. No. 11,941,586.

(51) Int. Cl.
  *G06Q 10/1093* (2023.01)
  *G06N 3/044* (2023.01)

(52) U.S. Cl.
  CPC ......... *G06Q 10/1095* (2013.01); *G06N 3/044* (2023.01)

(58) Field of Classification Search
  USPC .............................................. 705/7.11–7.42
  See application file for complete search history.

(56) References Cited

U.S. PATENT DOCUMENTS

| | | | | |
|---|---|---|---|---|
| 6,907,403 B1* | 6/2005 | Klein | ..................... | G06Q 40/04 705/36 R |
| 11,516,036 B1* | 11/2022 | Harathi | ............... | H04L 12/1827 |
| 2007/0011107 A1* | 1/2007 | Benson | ................. | H04L 9/3236 706/1 |
| 2011/0004575 A1* | 1/2011 | Yang | ....................... | G06F 1/324 713/320 |
| 2016/0275458 A1* | 9/2016 | Meushar | .............. | G06Q 10/109 |

(Continued)

OTHER PUBLICATIONS https://machinelearningmastery.com/prediction-intervals-for-deep-learning-neural-networks/ (Year: 2021).*

*Primary Examiner* — Alan S Miller
(74) *Attorney, Agent, or Firm* — Michael A. Springs, Esq.; Shumaker, Loop & Kendrick, LLP; Patrick B. Horne

(57) ABSTRACT

A system for applying an artificial intelligence engine to affect course corrections and influence outcomes of a meeting may include a network interconnecting a facilitator device, a teammate participant device, and a computing system operating a recurrent neural network. The facilitator device may receive parameters of a meeting including one or more of a meeting start time, a meeting location, a meeting duration, a meeting topic, and a list of teammate participant names. The teammate participant device may be a binary meeting score indicating if the meeting was either productive or not productive. The computing system may correlate the meeting score with the meeting parameters to create parameter scores. As scores are stored in the memory of the computing system, over time, the recurrent neural network may transform the parameter scores into parameter suggestions which may be conveyed to a meeting facilitator in real time.

20 Claims, 8 Drawing Sheets

(56) References Cited

U.S. PATENT DOCUMENTS

| | | | |
|---|---|---|---|
| 2018/0046957 A1* | 2/2018 | Yaari | G06Q 10/1095 |
| 2019/0342107 A1* | 11/2019 | Vogel | H04L 12/1822 |
| 2020/0403817 A1* | 12/2020 | Daredia | G06F 16/438 |
| 2021/0319408 A1* | 10/2021 | Jorasch | H04L 12/1827 |
| 2022/0014571 A1* | 1/2022 | Polish | H04L 65/1093 |

* cited by examiner

SYSTEM FOR APPLYING AN ARTIFICIAL INTELLIGENCE ENGINE IN REAL-TIME TO AFFECT COURSE CORRECTIONS AND INFLUENCE OUTCOMES

CROSS REFERENCE TO RELATED APPLICATIONS

This application is a continuation application tracing priority to co-pending U.S. application Ser. No. 17/717,312 filed on Apr. 11, 2022, the entirety of which is herein expressly incorporated by reference.

TECHNICAL FIELD AND BACKGROUND OF INVENTION

The present invention relates generally to the field of electronic device assisted meetings and, more particularly, to improving meeting quality by utilizing real-time feedback from meeting participants through an artificial intelligence engine which transforms the feedback into meeting parameter suggestions via a recurrent neural network (RNN).

Meetings are often plagued by inefficiencies, inattentiveness, and other issues such that some meetings are productive and other meetings are non-productive. Determining why some meetings are productive and others are not productive is challenging. Often a meeting may prove to be non-productive for no apparent reason. Anecdotal evidence as to reasons why a meeting might be unproductive can be misleading. Accordingly, there exists a need in the art for a system of improving meeting productivity.

BRIEF SUMMARY

It is therefore an object of the present invention to provide a system for improving meeting outcome and quality that may be utilized in real time by a meeting facilitator.

It is a further object of the present invention to provide a system that may be easily implemented so as not to be overly burdensome to meeting participants or meeting facilitator(s).

It is a further object of the present invention to provide a system that that may be integrated into existing meeting platforms, for instance, Microsoft Teams, Zoom, GoToMeeting, Skype, WebEx, Google Meet, and other remote meeting platforms.

These and other objects and advantages of the invention are achieved by providing a system for applying an artificial intelligence engine in real-time to affect course corrections and influence outcomes of a meeting. The system may include a facilitator device accessible by a human facilitator for facilitating the meeting among teammate participants. The facilitator device may include a memory device having computer-readable program code. The facilitator device may include a communication device and a processing device operatively coupled to the memory device and to the communication device. The processing device may be configured to execute the computer-readable code to receive from the human facilitator a plurality of parameters of the meeting including one or more of a meeting start time, a meeting location, a meeting duration, a meeting topic, and a list of teammate participant names. The processing device may be configured to convey a plurality of future meeting parameter suggestions to the human facilitator and to facilitate the meeting among the human facilitator and teammate participants.

According to one aspect, the system may also include a teammate participant device accessible by the teammate participants. The teammate participant device may include a memory device having computer-readable program code, a communication device, and a processing device operatively coupled to the memory device and to the communication device. The processing device may be configured to execute the computer-readable code to communicate with the facilitator device to facilitate the meeting among the human facilitator and teammate participants and receive from the teammate participants a binary meeting score indicating that the meeting was either productive or not productive.

According to another aspect, the system may also include a network interconnecting the teammate participant device, the facilitator device, and a computing system operating the artificial intelligence engine in the form of a recurrent neural network (RNN). The computing system may include a memory device having computer-readable program code, a communication device, and a processing device operatively coupled to the memory device and the communication device. The processing device may be configured to execute the computer-readable code to receive from the facilitator device the plurality of parameters of the meeting, receive from the teammate participant device the binary meeting score, correlate the binary meeting score to each of the plurality of parameters of the meeting to create parameter scores, store the parameter scores in the memory device, receive from the facilitator device an additional plurality of parameters of a new meeting, receive from the teammate participant device a binary additional meeting score, correlate the binary additional meeting score with the additional plurality of parameters of the new meeting to create additional parameter scores, store the additional parameter scores in the memory device, and feed the parameter scores and additional parameter scores from the memory device into the RNN to transform the parameter scores and additional parameter scores into the plurality of future meeting parameter suggestions.

According to another embodiment of the invention, the RNN may be configured to transform the parameter scores and additional parameter scores into the plurality of future meeting parameter suggestions at a predetermined confidence interval.

According to another embodiment of the invention, the predetermined confidence interval may be 95 percent using a t-test.

According to another embodiment of the invention, the predetermined confidence interval is 99 percent using a t-test.

According to another embodiment of the invention, the human facilitator and the teammate participants are not located in a same room.

According to another embodiment of the invention, the meeting is a virtual meeting and wherein the communication device includes a camera, a microphone, and a display device.

According to another embodiment of the invention, the binary meeting score is selectable by the teammate participants via a binary toggle button.

According to another embodiment of the invention, a system for applying an artificial intelligence engine in real-time to affect course corrections and influence outcomes of a meeting may include a facilitator device accessible by a human facilitator for facilitating the meeting among teammate participants having a processing device configured to receive meeting parameters and to convey future meeting parameter suggestions. The system may also include a teammate participant device accessible by a teammate participant and having a processing device configured to receive from the teammate participant a binary meeting score indicating that the meeting was either productive or not productive. The system may also include a network interconnecting the teammate participant device, the facilitator device, and a computing system operating the artificial intelligence engine in the form of a recurrent neural network (RNN). The computing system may include a processing device operatively coupled to a memory device. The processing device may be configured to execute the computer-readable code to: receive the meeting parameters from the facilitator device, receive the binary meeting score from the teammate participant device, correlate the binary meeting score to each of meeting parameters to create parameter scores, store the parameter scores in the memory device, and feed the parameter scores from the memory device into the RNN to transform the parameter scores into the future meeting parameter suggestions.

According to another embodiment of the invention, the RNN may be configured to transform the parameter scores into the future meeting parameter suggestions at a predetermined confidence interval.

According to another embodiment of the invention, the predetermined confidence interval may be 95 percent using a t-test According to another embodiment of the invention, the predetermined confidence interval is 99 percent using a t-test.

According to another embodiment of the invention, the human facilitator and the teammate participants are not located in a same room.

According to another embodiment of the invention, the meeting may be a virtual meeting and the communication device includes a camera, a microphone, and a display device.

According to another embodiment, the binary meeting score may be selectable by the teammate participants via a binary toggle button.

According to another embodiment of the invention, the meeting parameters may include one or more of a meeting start time, a meeting location, a meeting duration, a meeting topic, and a list of teammate participant names.

According to another embodiment of the invention, the facilitator device may further include a communication device for communicating with computing system and the teammate participant device via the network and a memory device having a computer-readable program code. The processing device may be operably coupled to the memory device to the communication device and may be configured to execute the computer-readable code.

According to another embodiment of the invention, the teammate participant device may further include a communication device for communicating with computing system and the facilitator device via the network and a memory device having a computer-readable program code. The processing device may be operably coupled to the memory device to the communication device and is configured to execute the computer-readable code.

According to another embodiment of the invention, a system for applying an artificial intelligence engine in real-time to affect course corrections and influence outcomes of a meeting, the system may include a network interconnecting a teammate participant device, a facilitator device, and a computing system operating the artificial intelligence engine in the form of a recurrent neural network (RNN). The computing system may include a processing device operatively coupled to a memory device. The processing device may be configured to execute the computer-readable code to receive a plurality of meeting parameters from the facilitator device, receive a binary meeting score from the teammate participant device, correlate the binary meeting score to each of meeting parameters to create parameter scores, store the parameter scores in the memory device, and feed the parameter scores from the memory device into the RNN to transform the parameter scores into future meeting parameter suggestions.

According to another embodiment of the invention, the RNN may be configured to transform the parameter scores into the future meeting parameter suggestions at a confidence interval is 95 percent using a t-test.

According to another embodiment of the invention, the plurality of meeting parameters includes one or more of: a meeting start time, a meeting location, a meeting duration, a meeting topic, and a list of teammate participant names.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWING FIGURES

Having thus described embodiments of the invention in general terms, reference will now be made to the accompanying drawings, wherein:

DETAILED DESCRIPTION OF EMBODIMENTS OF THE INVENTION

Figure 1:
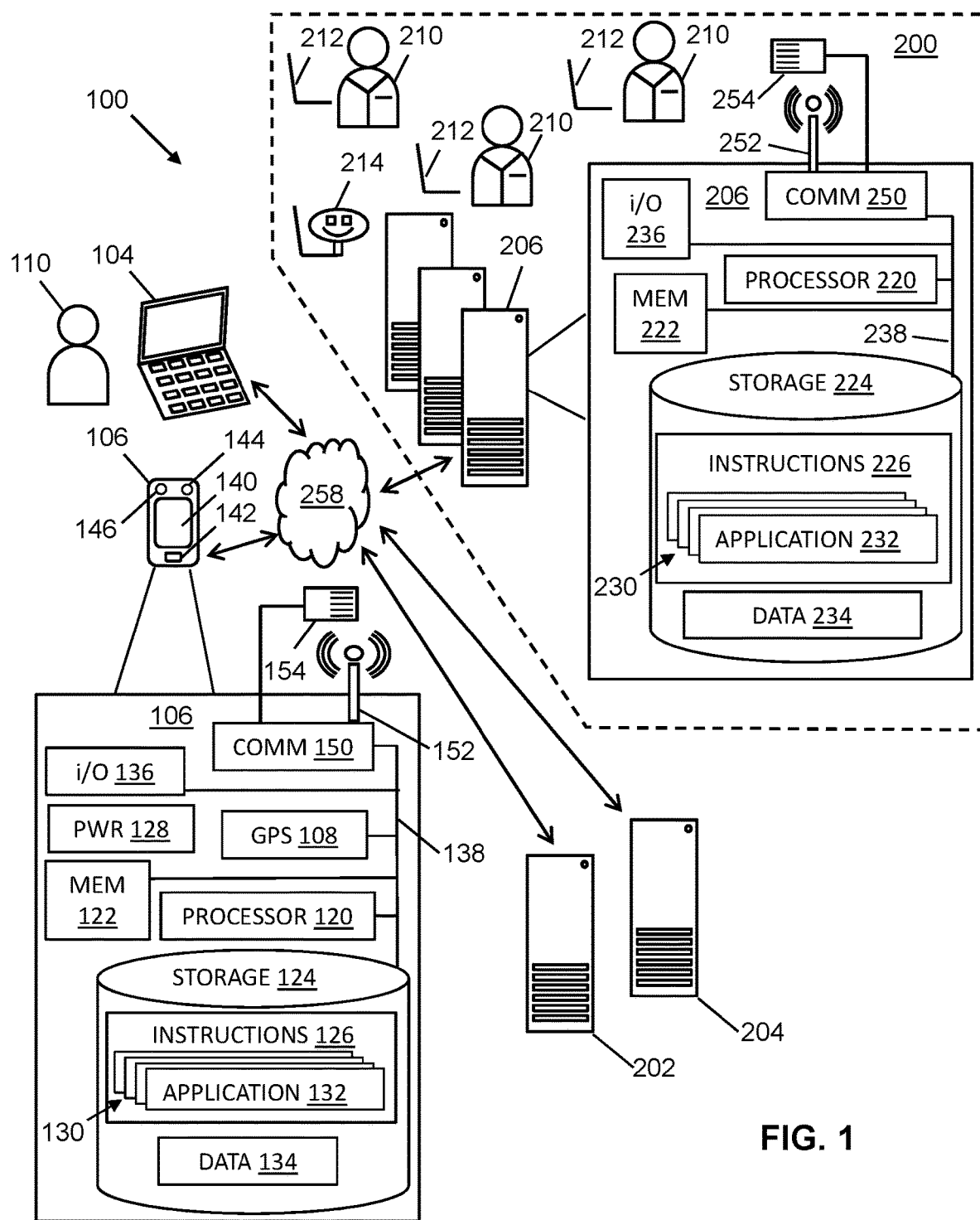
FIG. 1 illustrates an facilitator system, and environment thereof, according to at least one embodiment.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a teammate 110 benefits through use of services of an facilitator system 200. The teammate 110 accesses services by use of one or more teammate devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other teammate-accessible computing device.

Furthermore, the teammate device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The teammate 110 can be an individual, a group, or any entity in possession of or having access to the teammate device, referring to either or both of the mobile device 104 and computing device 106, which may be personal or public items. Although the teammate 110 may be singly represented in some drawings, at least in some embodiments according to these descriptions the teammate 110 is one of many such that a market or community of teammates, consumers, customers, business entities, government entities, clubs, and groups of any size are all within the scope of these descriptions.

The teammate device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, teammate files such as those for pictures, audio and/or video recordings, files downloaded or received from other devices, and other data items preferred by the teammate or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical teammate interface (GUI) on the display 140 that allows the teammate 110 to communicate with the mobile device 106, and, for example a mobile banking system, and/or other devices or systems. In one embodiment, when the teammate 110 decides to participate in a meeting, the teammate 110 downloads or otherwise obtains the meeting system client application from a mobile meeting system, for example facilitator system 200, or from a distinct application server. In other embodiments, the teammate 110 interacts with a mobile meeting system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the teammate device and the applications and devices that facilitate functions of the teammate device, or are in communication with the teammate device, to implement the functions described herein and others not expressly described. For example, the storage device may include such data as teammate authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and teammate inputs and outputs such as receiving commands from and providing displays to the teammate.

The mobile device 106, as illustrated, includes an input and output system 136, referring to, including, or operatively coupled with, teammate input devices and teammate output devices, which are operatively coupled to the processing device 120. The teammate output devices include a display 140 (e.g., a liquid crystal display or the like), which can be, as a non-limiting example, a touch screen of the mobile device 106, which serves both as an output device, by providing graphical and text indicia and presentations for viewing by one or more teammate 110, and as an input device, by providing virtual buttons, selectable options, a virtual keyboard, and other indicia that, when touched, control the mobile device 106 by teammate action. The teammate output devices include a speaker 144 or other audio device. The teammate input devices, which allow the mobile device 106 to receive data and actions such as button manipulations and touches from a teammate such as the teammate 110, may include any of a number of devices allowing the mobile device 106 to receive data from a teammate, such as a keypad, keyboard, touch-screen, touchpad, microphone 142, mouse, joystick, other pointer device, button, soft key, and/or other input device(s). The teammate interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other teammate input devices and output devices for use by or communication with the teammate 110 in accessing, using, and controlling, in whole or in part, the teammate device, referring to either or both of the computing device 104 and a mobile device 106. Inputs by one or more teammate 110 can thus be made via voice, text or graphical indicia selections. For example, such inputs in some examples correspond to teammate-side actions and communications seeking services and products of the facilitator system 200, and at least some outputs in such examples correspond to data representing facilitator-side actions and communications in two-way communications between a teammate 110 and an facilitator system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the teammate device. As discussed herein, the system intraconnect 138 may operatively couple various components with one another, or in other words, electrically connects those components, either directly or indirectly—by way of intermediate component(s)—with one another.

The teammate device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The facilitator system 200 can offer many types of meeting services and products to one or more teammates 110. Use of "service(s)" or "product(s)" thus relates to either or both in these descriptions. With regard, for example, to online information and meeting services, "service" and "product" are sometimes termed interchangeably. In non-limiting examples, meeting services might include online virtual meetings via platforms such as Microsoft Teams, Zoom, GoToMeeting, Skype, WebEx, Google Meet, and other remote meeting platforms.

To provide access to, or information regarding, some or all the services and products of the facilitator system 200, automated assistance may be provided by the facilitator system 200. For example, automated access to teammate accounts and replies to inquiries may be provided by facilitator-side automated voice, text, and graphical display communications and interactions. In at least some examples, multiple human facilitators 210, can be employed, utilized, authorized or referred by the facilitator system 200.

Human facilitators 210 may utilize facilitator devices 212 to serve teammates in their interactions to communicate and take action. The facilitator devices 212 can be, as non-limiting examples, computing devices, kiosks, terminals, smart devices such as phones, and devices and tools at customer service counters and windows at POS locations. In at least one example, the diagrammatic representation of the components of the teammate device 106 in FIG. 1 applies as well to one or both of the computing device 104 and the facilitator devices 212.

Facilitator devices 212 individually or collectively include input devices and output devices, including, as non-limiting examples, a touch screen, which serves both as an output device by providing graphical and text indicia and presentations for viewing by one or more facilitator 210, and as an input device by providing virtual buttons, selectable options, a virtual keyboard, and other indicia that, when touched or activated, control or prompt the facilitator device 212 by action of the attendant facilitator 210. Further non-limiting examples include, one or more of each, any, and all of a keyboard, a mouse, a touchpad, a joystick, a button, a switch, a light, an LED, a microphone serving as input device for example for voice input by a human facilitator 210, a speaker serving as an output device, a camera serving as an input device, a buzzer, a bell, a printer and/or other teammate input devices and output devices for use by or communication with a human facilitator 210 in accessing, using, and controlling, in whole or in part, the facilitator device 212.

Inputs by one or more human facilitators 210 can thus be made via voice, text or graphical indicia selections. For example, some inputs received by a facilitator device 212 in some examples correspond to, control, or prompt facilitator-side actions and communications offering services and products of the facilitator system 200, information thereof, or access thereto. At least some outputs by a facilitator device 212 in some examples correspond to, or are prompted by, teammate-side actions and communications in two-way communications between a teammate 110 and an facilitator-side human facilitator 210.

From a teammate perspective experience, an interaction in some examples within the scope of these descriptions begins with direct or first access to one or more human facilitators 210 in person, by phone, or online for example via a chat session or website function or feature. In other examples, a teammate is first assisted by a virtual facilitator 214 of the facilitator system 200, which may satisfy teammate requests or prompts by voice, text, or online functions, and may refer teammates to one or more human facilitators 210 once preliminary determinations or conditions are made or met.

A computing system 206 of the facilitator system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for teammate accounts, teammate profiles, account balances, and transaction histories, files downloaded or received from other devices, and other data items preferred by the teammate or required or related to any or all of the applications or programs 230.

The computing system 206, in the illustrated example, includes an input/output system 236, referring to, including, or operatively coupled with input devices and output devices such as, in a non-limiting example, facilitator devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the teammate device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The teammate devices, referring to either or both of the mobile device 104 and computing device 106, the facilitator devices 212, and the facilitator computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an facilitator or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data storage, data processing, and machine learning processors. In at least one example, the external systems 202 and 204 represent an artificial intelligence engine, such as a recurrent neural network, utilized by the facilitator system 200 in facilitating meetings among teammates 110. In another example, the external systems 202 and 204 represent third party systems such configured to interact with the teammate devices 106 during meetings and also configured to interact with the facilitator system 200 in meetings.

In certain embodiments, one or more of the systems such as the teammate device 106, the facilitator system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2A:
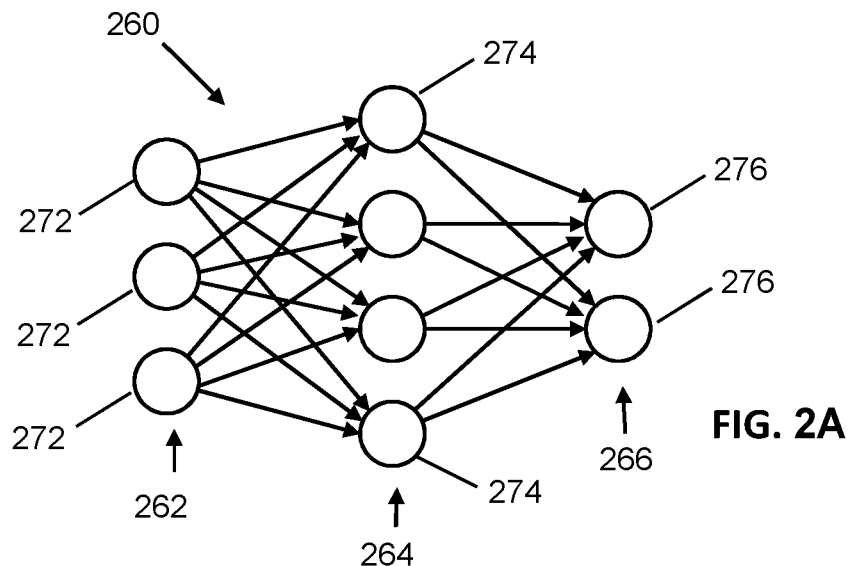
FIG. 2A is a diagram of a feedforward network, according to at least one embodiment, utilized in machine learning.
Figure 2B:
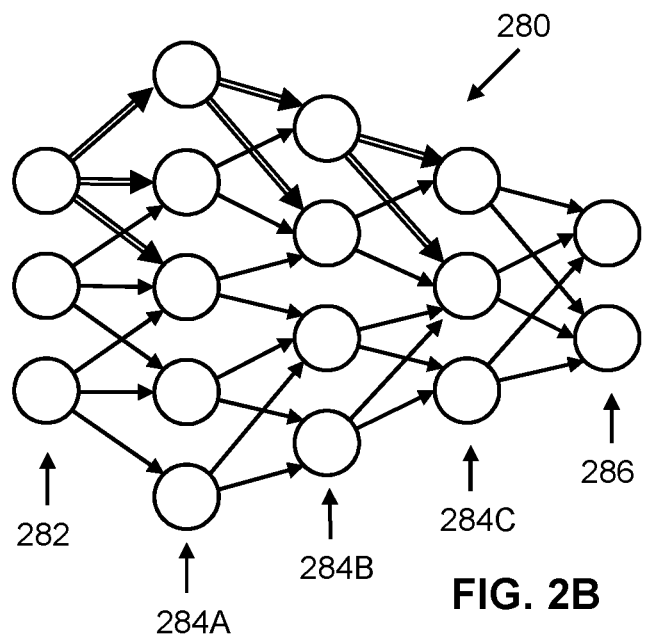
FIG. 2B is a diagram of a convolution neural network, according to at least one embodiment, utilized in machine learning.
Figure 2C:
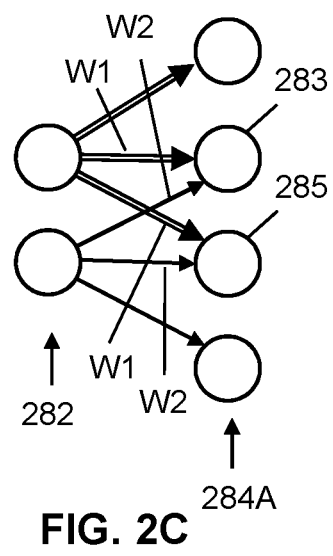
FIG. 2C is a diagram of a portion of the convolution neural network of FIG. 2B, according to at least one embodiment, illustrating assigned weights at connections or neurons.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
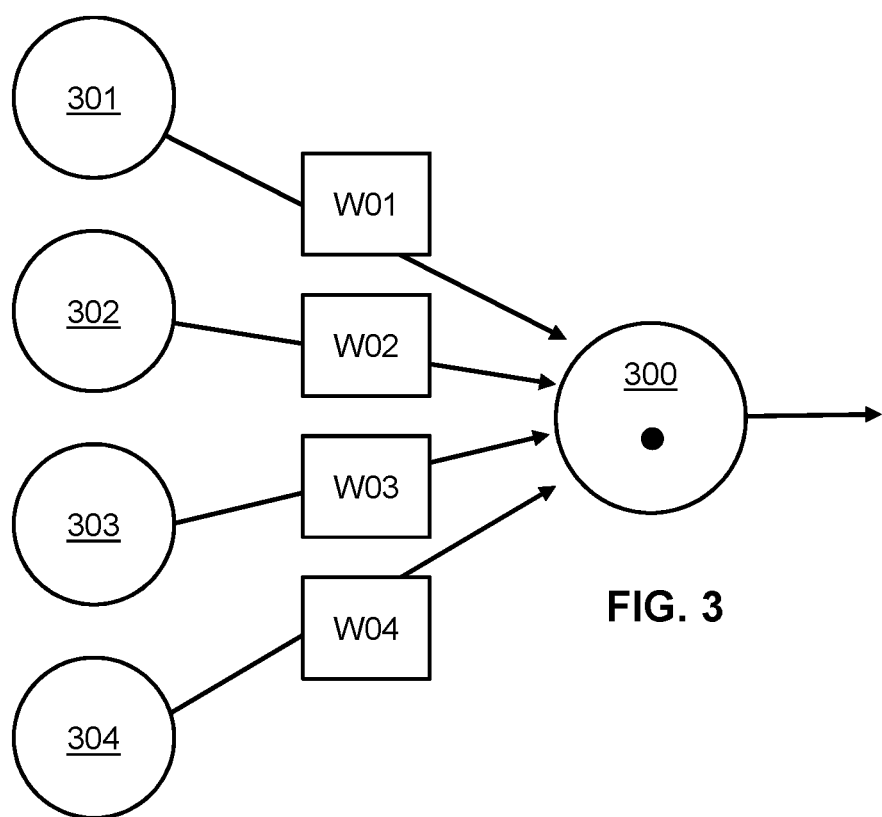
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301,

302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 4:
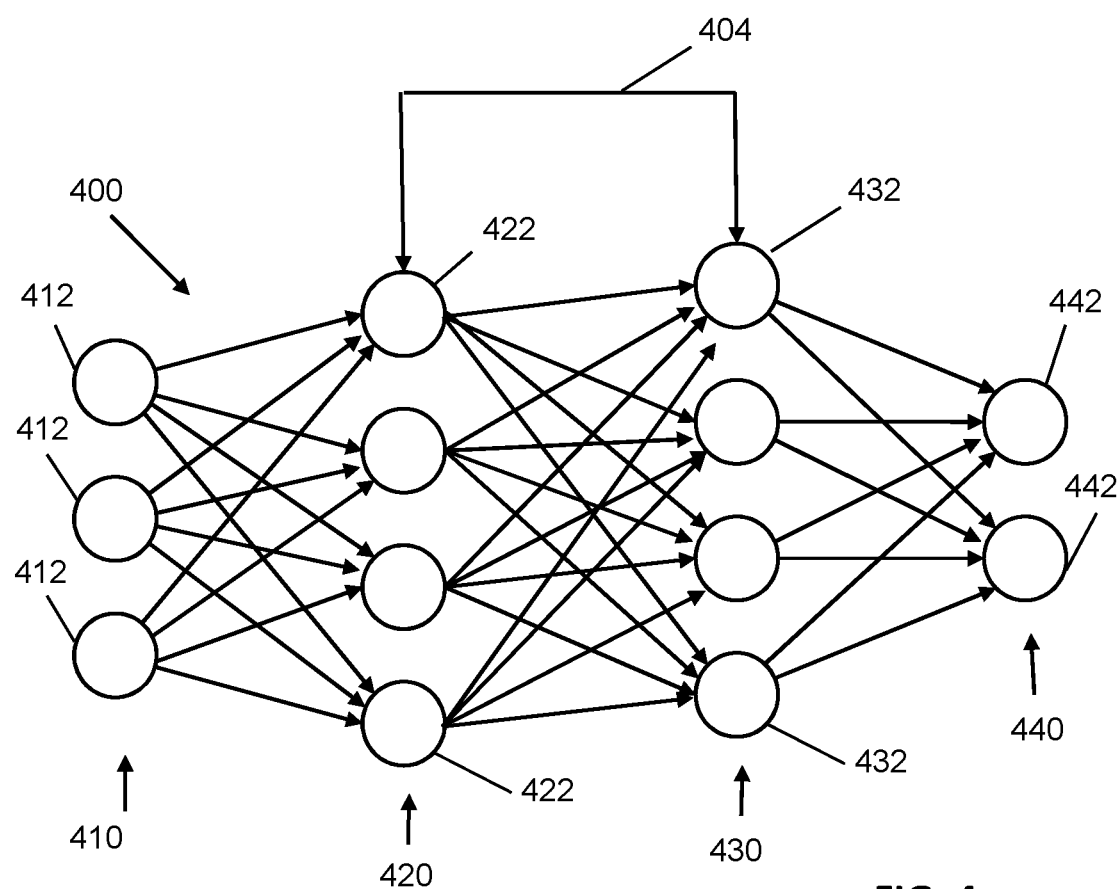
FIG. 4 is a diagram of a Recurrent Neural Network RNN, according to at least one embodiment, utilized in machine learning.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Figure 5:
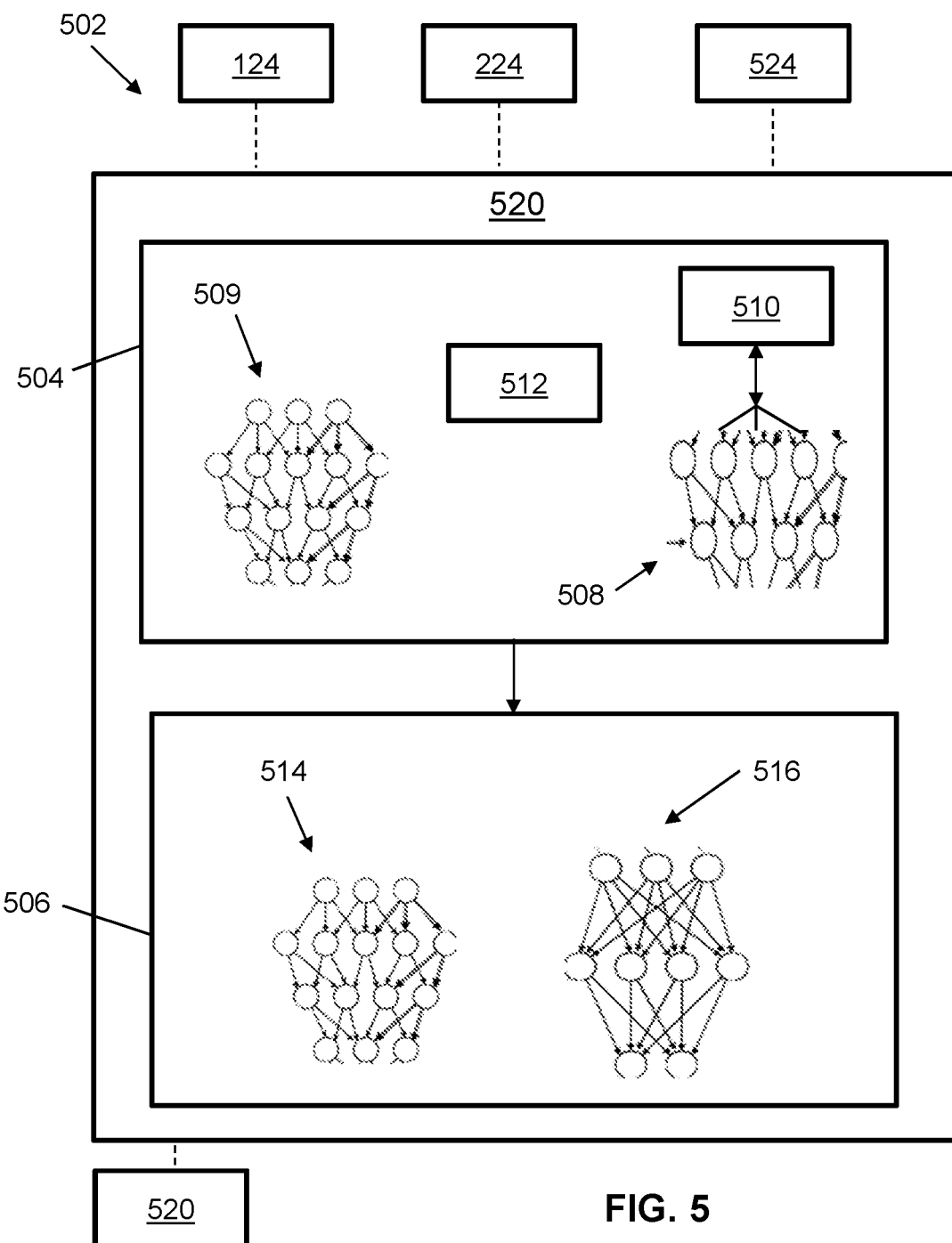
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g, CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Figure 6:
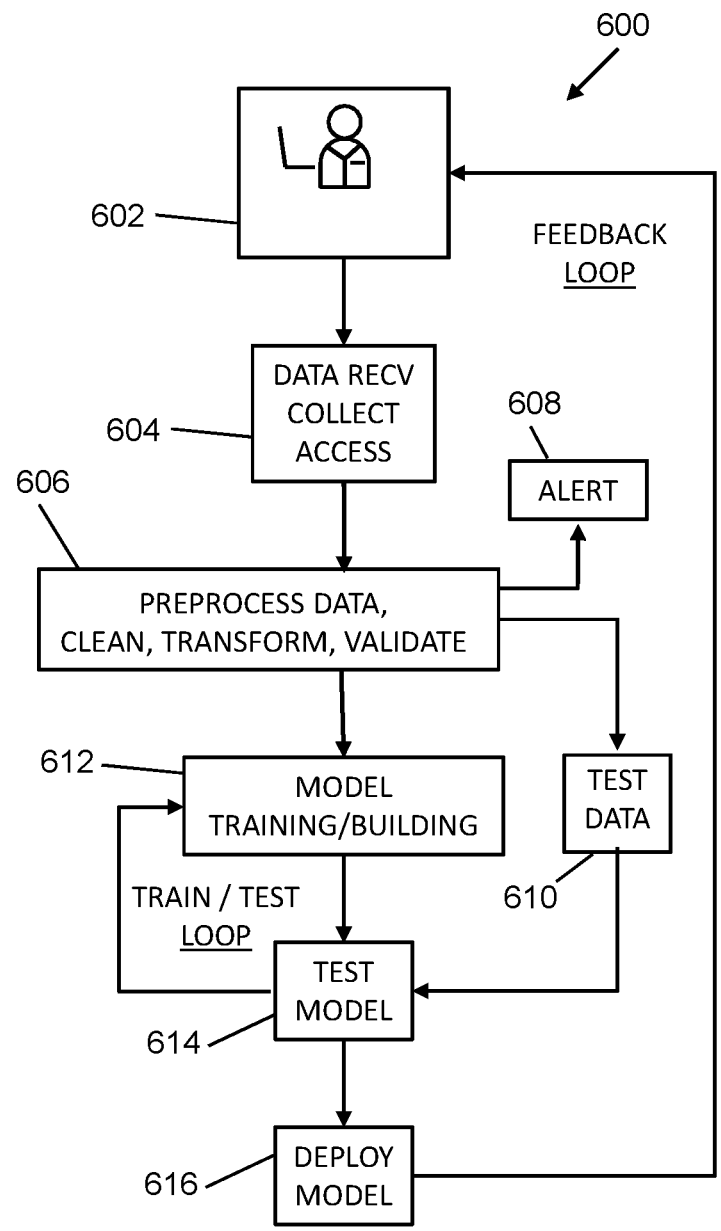
FIG. 6 is a flow chart representing a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine learning project.

In step 602, a teammate authorizes, requests, manages, or initiates the machine-learning workflow. This may represent a teammate such as human facilitator, or customer, requesting machine-learning assistance or AI functionality to simulate intelligent behavior (such as a virtual facilitator) or other machine-assisted or computerized tasks that may, for example, entail visual perception, speech recognition, decision-making, translation, forecasting, predictive modelling, and/or suggestions as non-limiting examples. In a first iteration from the teammate perspective, step 602 can represent a starting point. However, with regard to continuing or improving an ongoing machine learning workflow, step 602 can represent an opportunity for further teammate input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating teammate, other human or virtual facilitators, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Figure 7:
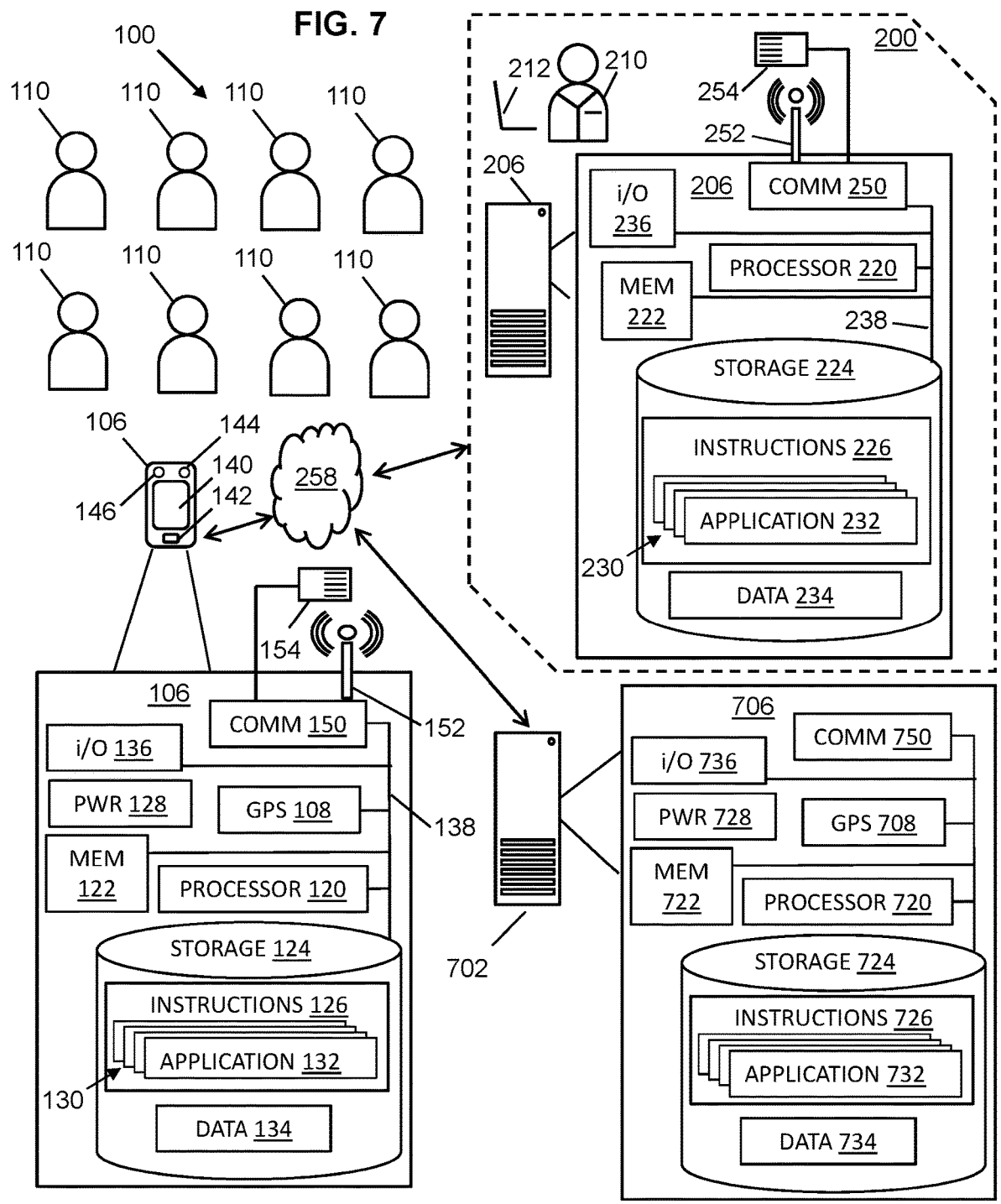
FIG. 7 illustrates a system and environment thereof according to one embodiment of the present invention.
Figure 8:
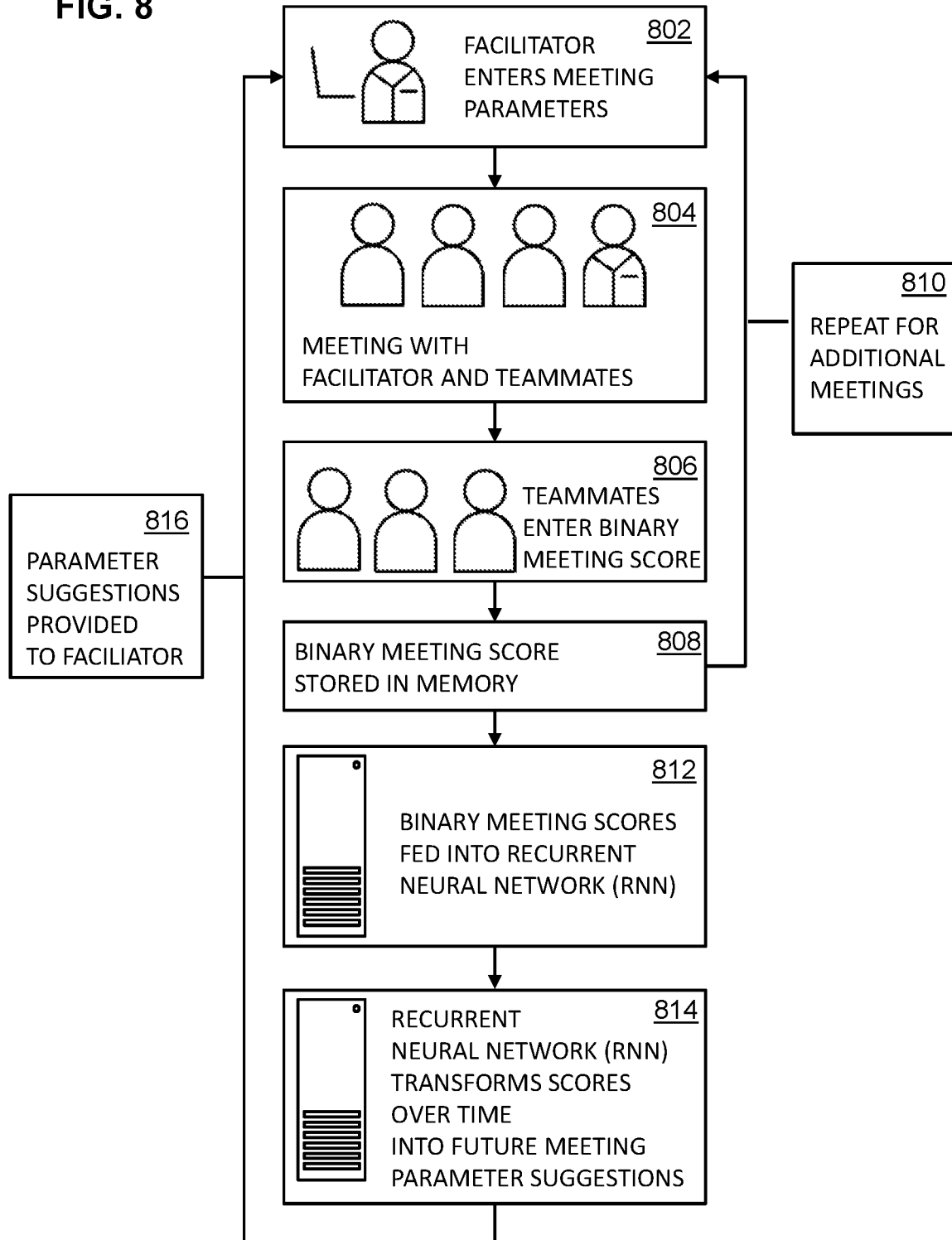
FIG. 8 is a flow chart representing an embodiment of the system of the present invention utilizing the RNN to make suggestions for meeting parameters.

Referring now to FIG. 7 and FIG. 8, according to one embodiment of the present invention, a system for applying an artificial intelligence engine in real-time to affect course corrections and to influence outcomes of a meeting may employee the system 100. As shown in FIG. 7, the system 100 may include a plurality of human teammate participants 110 and a single human facilitator 210. According to the embodiment, the human facilitator 210 may be tasked with facilitating a meeting as shown in FIG. 8. The meeting may be conducted virtually over the network 258. The meeting may use a remote platform similar to that operated by Microsoft Teams, Zoom, GoToMeeting, Skype, WebEx, Google Meet, and other remote meeting platforms.

When facilitating a meeting, the human facilitator 210 utilizes a facilitator device 206 which includes memory device 222 having computer-readable code 226. The facilitator device 206 also has communication device 250 and processing device 220.

When participating in a meeting, each human teammate 110 participant utilizes a teammate participant device 106. Each teammate participant device 106 includes memory device 122 having computer-readable code 126. Each teammate participant device 106 also has communication device 150 and processing device 120. The participant device 106 communicates with the facilitator device 206 via network 248.

Also in communication with the teammate participant device 106 and the facilitator device 206 via network 258 is the computing system 702 which operates the artificial intelligence engine in the form of the recurrent neural network (RNN) 812, 814 as show in FIG. 8. See also FIG. 4. The computing system 702 includes memory device 722 having computer-readable code 726. The computing system 702 also has communication device 750 and processing device 720. The computing system 702 communicates with the facilitator device 206 and the teammate participant device 106 via network 258.

When a human facilitator 210 desires to conduct a meeting among human teammate participants 110, the human facilitator 210 must first determine a listing of meeting parameters. See FIG. 8. The parameters may include one or more of a meeting start time, a meeting location, a meeting duration, a meeting topic, and a list of teammate participant names. The human facilitator 210 enters these parameters into the facilitator device 206 as show at numeral 802 in FIG. 8. The facilitator and the teammate participants then engage in the meeting 804. At the conclusion of the meeting, the teammate participants then enter a binary meeting score 806. The binary meeting score indicates either that the meeting was productive or that it was not productive. The binary meeting score is then transmitted 808 to the computing system 702 which then correlates the binary meeting score with each of the meeting parameters which were entered by the facilitator 210 prior to the meeting. As part of this process, each parameter is scored.

This process is then repeated 810 such that successive meetings and respective meeting parameters set by the facilitator are scored and the data stored in the memory of the computing system 702. Over time, these scores are fed into the RNN 812. The RNN operates as disclosed above and in FIG. 4. Over time, the RNN is trained to learn information about the meeting parameters. For instance, the RNN might determine that meetings on a certain topic are best held in the morning, or that meetings including certain of the teammates are better held in the afternoon, or that certain meetings are best held by teammates in a certainly location. That is, based on the binary scoring that has been correlated to each parameter, the RNN learns optimal parameters for different clusters of parameters. Accordingly, over time, the RNN will reach a predetermined confidence interval, which might be 95% or greater, at which the RNN will be able to make meeting parameter suggestions 814. These meeting parameter suggestions will be conveyed to the human facilitator 816. These meeting parameter suggestions may aid the human facilitator as the human facilitator is planning future meetings 802.

For instance, once the RNN has reached the predetermined confidence interval, and once the human facilitator begins to enter new meeting parameters 802, the RNN will make suggestions 816 in order to improve meeting productivity. For instance and by way of one non-limiting example, if the human facilitator desires to conduct a meeting at 8 AM Friday morning on the topic of planning and involving teammates John, Jane, and Cory, based on what the RNN has learned from previous parameter scores, the RNN may have learned that a meeting with John, Jane, and Cory on the topic of planning may be more productive if held Thursday at 1 PM. Accordingly, the suggestion 816 to move the meeting to Thursday at 1 PM would be made to the human facilitator 210. Similarly, if the meeting facilitator desires to conduct a meeting at 3 PM on Wednesday on the topic of strategy, involving Jim, Jack, and George and lasting 2 hrs, based on what the RNN has learned from previous parameter scores, the RNN may have learned that a meeting with Jim, Jack, and George on the topic of strategy may be more productive if, rather than lasting 2 hrs, it could be shortened to 45 minutes. Or, should also include Barbara. Or should be conducted over lunch. Or should be conducted outside.

Accordingly, over time, the RNN is able to be trained on meeting parameters and how these parameters interact to form productive and non-productive meetings. Utilizing RNN, the computing system is able to transform mere binary parameter scores into real time feedback provided to human facilitators in order to affect course corrects and to improve meeting outcomes.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A computer-implemented method for training a neural network, the method comprising:
    a) training, using a first set of training test data, a recurrent neural network (RNN) of an artificial intelligence engine loaded on a server to predict optimal parameters using an iterative training and testing loop that iteratively tests the first set of training test data compared to a target variable and makes adjustments in subsequent iterations to improve predictability of the target variable thereby improving accuracy of the artificial intelligence engine;
    b) receiving into the server, via a network, a plurality of meeting parameters from a facilitator device;
    c) receiving into the server, via the network, a binary meeting score from a plurality of teammate devices upon conclusion of a meeting;
    d) correlating, by the server, the plurality of meeting parameters with the binary meeting scores into a correlated data set for use as a second set of training test data;
    e) feeding the correlated data set into the RNN as part of a feedback loop to improve predictability of the optimal parameters by the RNN; and
    f) repeating steps a) through e) as part of a retraining process.

2. The method of claim 1 wherein step f) is repeated until a predetermined confidence interval of the optimal parameters has been achieved, and based thereon distribute, to the facilitator device, the optimal parameters that correlate to parameters of a new meeting in response to receiving a request to host the new meeting.

3. The method of claim 2 wherein the predetermined confidence interval is 95 percent using a t-test.

4. The method of claim 2 wherein in the predetermined confidence interval is 99 percent using a t-test.

5. The method of claim 1 wherein the meeting of step d) is a virtual meeting.

6. The method of claim 2 wherein the binary meeting score indicates that the meeting was either productive or not productive.

7. The method of claim 6 wherein the binary meeting score is selectable via a button.

8. The method of claim 1 wherein the plurality of meeting parameters include one or more of: a meeting start time, a meeting location, a meeting duration, a meeting topic, and a list of teammate participant names.

9. The method of claim 1 wherein each of the teammate devices comprises: a memory device having computer-readable program code; a communication device; a processing device operatively coupled to the memory device and to the communication device, wherein the processing device is configured to execute the computer-readable code to: communicate with the facilitator device and the server to facilitate the meeting, and transmit the binary meeting score.

10. The method of claim 1 wherein the facilitator device comprises: a memory device having computer-readable program code; a communication device; a processing device operatively coupled to the memory device and to the communication device, wherein the processing device is configured to execute the computer-readable code to: receive the optimal parameters from the server, convey the optimal parameters to a human facilitator; and facilitate the meeting.

11. The method of claim 1 wherein the server comprises: a memory device having computer-readable program code; a communication device; a processing device operatively coupled to the memory device and the communication device, wherein the processing device is configured to execute the computer-readable code to store the parameter scores in the memory device.

12. The method of claim 1 wherein the RNN comprises an input layer, an output layer, and a plurality of consecutive hidden layers.

13. A computer-implemented method facilitating training a neural network, comprising:

a) transmitting, via a network by a facilitator device, a plurality of meeting parameters for a meeting to a server hosting a trained and deployed neural network, the neural network comprising a recurrent neural network iteratively trained, via a training and testing loop, using a first set of training test data;

b) receiving, from via the network at the facilitator device, a first set of optimal parameters from the server, the first set of optimal parameters being predicted by the neural network in response to the plurality of meeting parameters;

c) hosting, by the facilitator device, the meeting based on the first set of optimal parameters received;

d) transmitting, from the facilitator device via the network to the server, meeting parameters of the meeting to facilitate retraining the neural network, wherein the neural network correlates the meeting parameters of the meeting with a binary meeting score received from a plurality of teammate devices for retraining of the neural network;

e) transmitting, via the network to the server, new meeting parameters for a new meeting;

f) receiving, from the server, a second set of optimal parameters, wherein the second set of optimal parameters is predicted using the retrained neural network;

g) hosting, by the facilitator device, the new meeting based on the second set of optimal parameters; and h) repeating the transmitting of step d) to facilitate retraining of the neural network.

14. The method of claim 13 wherein steps e)-h) are repeated until a predetermined confidence interval of optimal meeting parameters has been achieved.

15. The method of claim 14 wherein the predetermined confidence interval is 95 percent using a t-test.

16. The method of claim 14 wherein in the predetermined confidence interval is 99 percent using a t-test.

17. The method of claim 13 wherein the meeting of step c) and the new meeting of step g) are virtual meetings.

18. The method of claim 13 wherein the binary meeting score indicates that the meeting was either productive or not productive.

19. The method of claim 18 wherein the binary meeting score is selectable via a button.

20. The method of claim 13 wherein the plurality of meeting parameters include one or more of: a meeting start time, a meeting location, a meeting duration, a meeting topic, and a list of teammate participant names.

\* \* \* \* \*